UNITED STATES PATENT OFFICE.

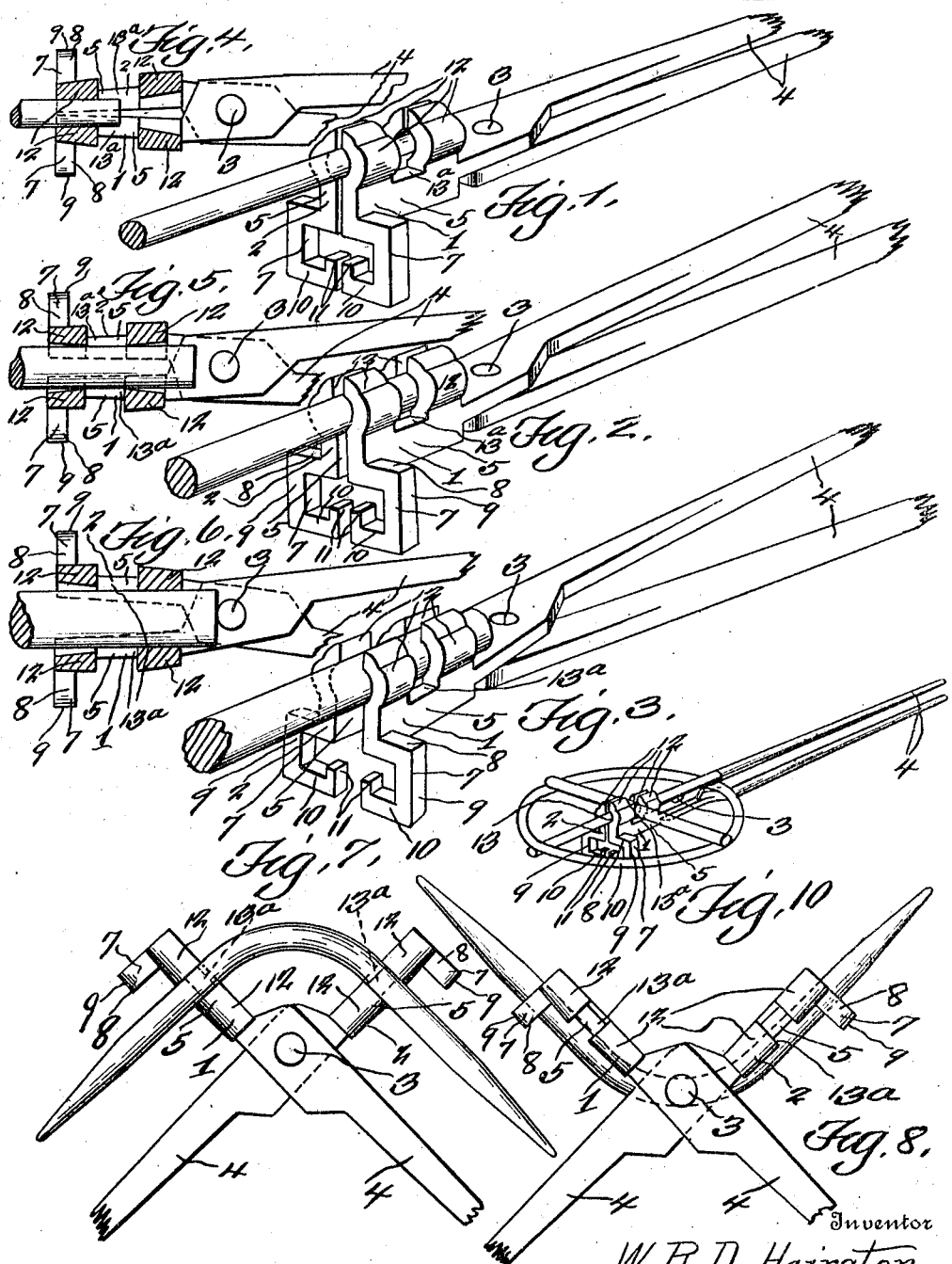

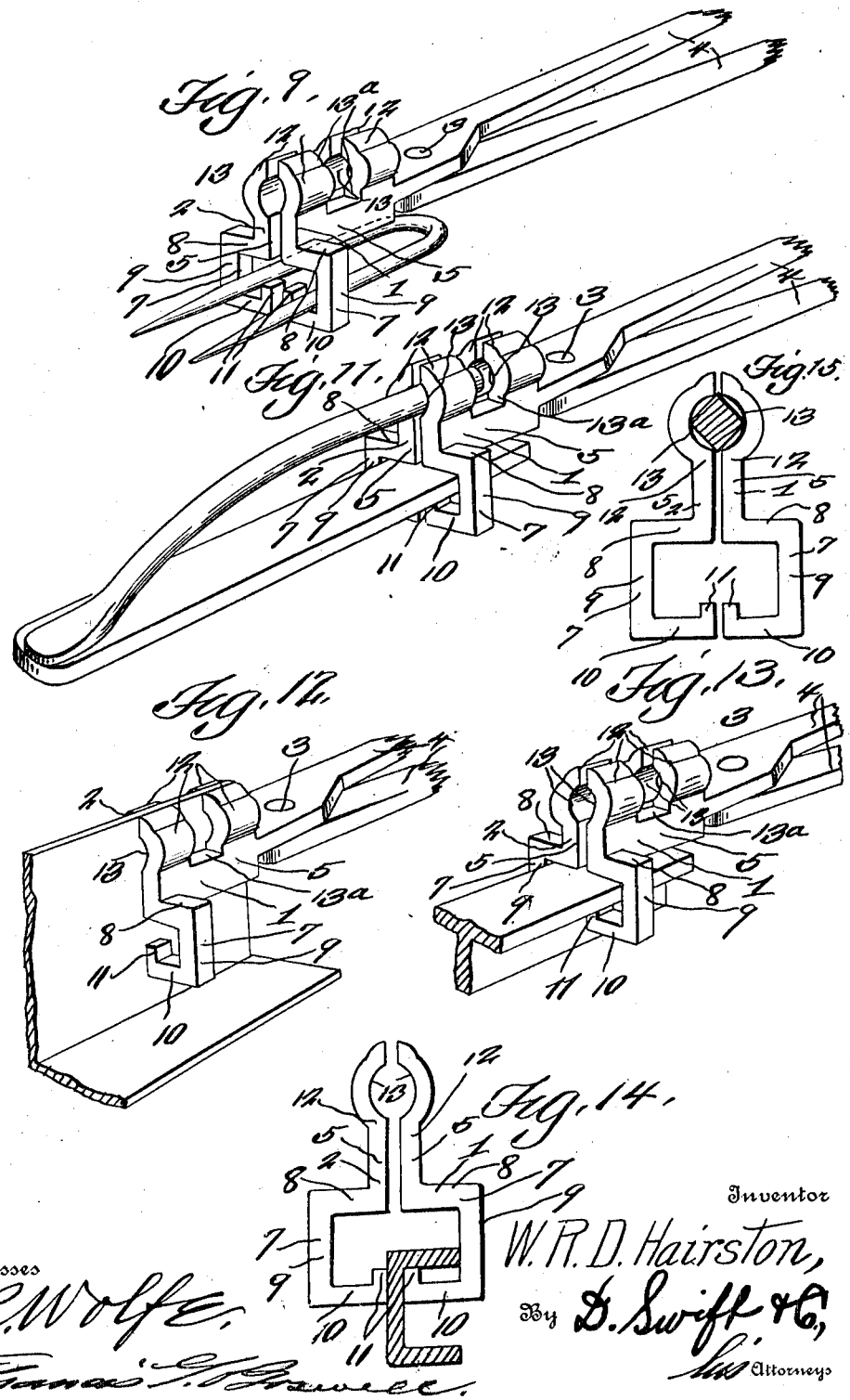

WILLIAM R. D. HAIRSTON, OF NETTLETON, MISSISSIPPI.

BLACKSMITH'S TONGS.

1,096,835.  Specification of Letters Patent.  Patented May 19, 1914.

Application filed January 31, 1914. Serial No. 815,623.

*To all whom it may concern:*

Be it known that I, WILLIAM R. D. HAIRSTON, a citizen of the United States, residing at Nettleton, in the county of Lee and State of Mississippi, have invented a new and useful Blacksmith's Tongs; and I do hereby declare the following to be a full, clear, and exact description of the invention, such as will enable others skilled in the art to which it appertains to make and use the same.

The aim of this new and useful invention (blacksmith's tongs) is to improve the construction of the tongs illustrated, set forth and claimed in the patent of July 29, 1913, No. 1,069,005, as well as adding to the durability.

The invention aims as a further object to provide a single pair of tongs, enabled to produce additional results to those embodied in said above-named patent.

It is known that all blacksmiths are supplied with a multiplicity of tongs, in order to grasp and hold firmly, the various shapes of stock iron or material, it being understood that the jaws of each pair of tongs should grip firmly and parallel against the iron stock or other material to hold the same firmly, which is the reason for necessitating a multiplicity of tongs. However, by the provision and use of these improved tongs various bars, rods and other iron stock material and the like of various contours and constructions may be grasped and held in various positions. Furthermore, a plurality of round rods may be grasped by these improved tongs, as will be seen in the drawings and hereinafter set forth, and in addition staples may be constructed, in other words, bent into shape.

The invention comprises further features and combination of parts, as hereinafter set forth, shown in the drawings and claimed.

In the drawings:—Figure 1 is a view in perspective showing the tongs as grasping a round rod of one diameter in cross section. Fig. 2 is a similar view showing the tongs grasping a round rod of another diameter in cross section. Fig. 3 is a similar view showing the tongs grasping a round rod of still a different diameter in cross section. Fig. 4 is a sectional view showing a small cylindrical rod held. Fig. 5 is a sectional view showing a larger cylindrical rod grasped. Fig. 6 is a sectional view showing still another rod of larger diameter grasped. Fig. 7 is a plan view showing the first step in bending the rod to form a staple. Fig. 8 is a plan view showing the second step in forming a staple. Fig. 9 shows the staple completed. Fig. 10 is a perspective view showing how a crude hand wheel may be constructed or welded. Fig. 11 shows how a round rod and a flat rod may be grasped at the same time to construct a pole cap. Figs. 12, 13 and 14 are views showing the tongs grasping bars of other shapes. Fig. 15 is a detail view showing a square rod grasped.

Referring more especially to the drawings, 1 and 2 designate a pair of jaws, pivoted at 3 and terminating in handles 4. Each jaw comprises a body 5, the free end of which terminates in a laterally extending rectangular portion 7 which comprises the parts 8, 9, 10 and the lug 11. Extending laterally from each body is a pair of offset lugs 12 having semi-circular grooves 13. The lugs of one pair of each body are disposed opposite to the lugs of the other pair of the opposite body, there being a space or recessed out portion 13ª between the lugs of each pair. The forward faces of the forward lugs are in a plane alined with the forward faces of the rectangular portions 7.

It will be observed that the rearwardly disposed opposite lugs are separated farther apart than the forward lugs, so that the semi-circular recesses (which are so shaped, that is, their longitudinal plane, as to squarely and firmly engage a round rod) will grip a cylindrical rod and hold the same rigidly, which rod is of one diameter, as shown in the drawing, without the recesses of the forward lugs engaging said rod. The semi-circular recesses of the forward lugs are so shaped and constructed, throughout their longitudinal plane as to grip a cylindrical rod of another diameter firmly and squarely holding the same rigidly, it will be observed from the drawings that by bringing both sets of lugs 12 parallel, a cylindrical rod of an intermediate diameter may be held rigidly, the semi-circular recesses of both sets of lugs engaging said rod. Furthermore a heated piece of iron stock material or the like may be placed in the recesses or cutout portions 13ª, and by opening the jaws said piece of material may be bent, as shown in the drawings, thereby performing the first step in bending and shaping a staple. After the material has been so shaped, the same may be removed, and the opposite end placed between the jaws, the jaws being opened to their fullest extent, either in the semi-circular recesses, or between the rectangular portions 7 as shown in the drawings, subsequently to which the jaws may be brought together, performing the second and last step in shaping or constructing the staple. By virtue of the grooves 13 a cylindrical rod may be clamped, and then slightly bent so that one of its ends will bear against a flat bar (which may be clamped between the angular portions 7 of the jaws) so that the contacting portions of the flat bar and the cylindrical rod may be welded together. This is one of the many uses that these improved tongs may perform in a blacksmith's shop.

In making a pole cap or tongue iron, it is necessary to weld a cylindrical rod to two pieces of flat metal or flat bars, in order to complete the structure of the pole cap. As shown in the drawings flat bars may be held between the body of the jaws, while various bars angular or the like in cross section may be held by the laterally extending rectangular portions 7, for instance, as in constructing a pole cap or tongue iron.

In Fig. 10 the tongs are shown grasping two intersecting rods, whereby a crude hand wheel may be constructed. For instance, two intersecting rods (which may be previously welded at their intersection) is grasped by the tongs, one rod being engaged by the semi-circular recesses 13, while the other rod extends transversely of the recesses 13$^a$, whereas a round ring is disposed as shown in Fig. 10. Then by heating one of the ends of one of the intersecting rods and a portion of the round ring adjacent said end, one of the intersecting rods may be welded to the ring. After which the other ends of the said intersecting rod may be likewise welded to the ring. To steady the position of the ring, one of the handles may be slightly sprung or bent, so that the ring may be held between the handles, as shown in Fig. 10. After the intersecting rods have been welded to the ring, then the intersecting point or junction of the rods may be shaped into a small hub, and provided with a round, square or otherwise shaped aperture to receive a spindle.

It is to be understood that these tongs may be used for grasping a great variety of shapes of iron or other stock material. For instance, a plow share or plow point may be grasped or held, or square rods may be held equally as well by engagement of the recesses 12 therewith, as shown in Fig. 15. Also bolts and nuts may be held. However, as far as the patent is concerned it is not wholly necessary to illustrate every conceivable shape of stock material, but it is only essential to illustrate a small variety. Furthermore, the patentee is not to be limited or restricted to the exact terms of what is claimed.

The invention having been set forth, what is claimed as new and useful is:—

1. In combination, a pair of jaws pivoted together and terminating in handles, each jaw comprising a body portion, the free end of which terminates in a laterally extending offset angular portion terminating in an inwardly directed lug, and a pair of alined laterally extending lugs forming parts of the body and spaced apart forming recesses and projecting from the side of the door opposite said rectangular portion, the adjacent faces of the opposing lugs of said pairs of lugs having semi-circular recesses of such construction as to permit rods of different diameters in cross section to be grasped, the recesses between the pairs of lugs of both jaws being arranged at right angles to the semi-circular recesses, as and for the purpose set forth.

2. In combination, a pair of jaws pivoted together and terminating in handles, said jaws comprising body portions having laterally extending offset angular portions, the opposite edges of said body portions to the angular portions having opposing gripping lugs, the adjacent faces of which are constructed with semi-circular recesses of different shapes in longitudinal plane, whereby rods of different diameters in cross section may be grasped.

3. In combination, a pair of jaws pivoted together and terminating in handles, said jaws comprising body portions having laterally extending offset angular portions, the opposite edges of said body portions to the angular portions having opposing gripping lugs, the adjacent faces of which are constructed with semi-circular recesses of different shapes in longitudinal plane, whereby rods of different diameters in cross section may be grasped, a lug of each body portion being spaced apart from the similar lug of the same body portion forming a recess, which is in registration with a like recess of the opposing jaw.

4. In combination, a pair of jaws pivoted together and terminating in handles, said jaws comprising body portions having laterally extending offset angular portions, the edges of the body portions opposite the angular portions having opposing gripping lugs arranged in pairs, said pairs of opposing lugs being spaced apart forming registering recesses adapted to receive an iron rod whereby the same may be bent by separating the jaws.

5. In combination, a pair of crossed members pivoted at their crossing point, each member terminating at one end in a handle; the members at their other extremities terminating in duplicate jaws having rectangular supplemental jaws extending in opposite directions, said supplemental jaws being alined; the edges of said jaws opposite the supplemental jaws having opposing gripping lugs arranged in pairs, said pairs of opposing lugs being spaced apart forming registering recesses adapted to receive an iron rod whereby the same may be bent by separating the jaws, said supplemental jaws and said pairs of lugs adapted to hold two pieces of metal in position to be welded.

6. In combination, a pair of crossed members pivoted at their crossing point, each member terminating at one end in a handle; the members at their other extremities terminating in duplicate jaws, said jaws having pairs of opposing gripping lugs extending laterally, provided with semi-circular recesses, said pairs of opposing lugs being spaced apart forming registering recesses at right angles to the semi-circular recesses designed to receive an iron rod whereby the same may be bent by separating the jaws; said jaws having rectangular supplemental jaws extending in opposite directions to the lug and being alined and arranged in a plane parallel to the lugs; and said supplemental jaws at their utmost extremities having lugs bent inwardly.

In testimony whereof I have signed my name to this specification in the presence of two subscribing witnesses.

WILLIAM R. D. HAIRSTON.

Witnesses:
F. E. BALLARD,
SIDNEY CHRISTIAN.